Nov. 24, 1970 H. SCHLUTER ET AL 3,542,966

PRIVATE AUTOMATIC BRANCH EXCHANGES WITH CALLBACK TRAFFIC

Filed April 14, 1967 2 Sheets-Sheet 1

Nov. 24, 1970 H. SCHLUTER ET AL 3,542,966

PRIVATE AUTOMATIC BRANCH EXCHANGES WITH CALLBACK TRAFFIC

Filed April 14, 1967 2 Sheets-Sheet 2

United States Patent Office 3,542,966

Patented Nov. 24, 1970

3,542,966

PRIVATE AUTOMATIC BRANCH EXCHANGES WITH CALLBACK TRAFFIC

Heinz Schluter, Kornwestheim, and Hans Dieter Siebel, Munchingen, Germany, assignors to International Standard Electric Corporation, New York, N.Y., a corporation of Delaware Filed Apr. 14, 1967, Ser. No. 630,883
Claims priority, application Germany, Apr. 27, 1966, St 25,291
Int. Cl. H04m 3/58
U.S. Cl. 179—18 6 Claims

ABSTRACT OF THE DISCLOSURE

Each trunk link has two equally entitled outputs to the switching network. One output serves the outgoing and terminating trunk traffic and the other equally entitled output serves the callback traffic. These outputs can be connected through an internally controlled switching multiple in the trunk link arbitrarily with either the trunk route or the callback route. With such an arrangement of the trunk links, the number of the seldom used crosspoints can be reduced.

The invention relates to a circuit arrangement for private automatic branch exchanges with callback traffic.

The term "callback traffic" describes the case where a called subscriber may enter into the existing trunk connection and then be able to establish a connection with another subscriber via a callback connection. Sometimes the term called "call transfer" is used instead of the term "callback." Very often the callback systems provide selector-stages having two callback outputs per trunk line. Thus, if an extension is made to a trunk connection via the first callback output, the called subscriber can establish callback via the second callback output. If the extension which is called via the second callback output takes over the trunk line, the first output becomes available again and may be used again for making another callback.

A known circuit arrangement requires only one callback output to obtain the same effect. In this circuit arrangement, the trunk link or trunk circuit is always seized first via the first output to the switching network of the PABX. A first callback connection is always led via a second output to the switching network of said PABX. If the callback extension entering the trunk line connection initiates a second callback connection, the first output of the trunk link is used again, after the respective feeder circuit has been connected with said output through switch-over contacts.

Some crosspoint arrangements use a conjugated route selection. For example, in a register system or in a central control system, the trunk links are connected to the switching network with one output for outgoing and incoming trunk connections and one output for callback connections. No second output for callback connections is required because the central control can generally reroute the subscriber station, which was called, during the callback to the output for terminating and outgoing trunk connections.

Various solutions are possible for the connection of the callback outputs to the switching network. First, it is possible to connect the callback output and the output for outgoing and terminating trunk connections in the same switching stage at the same switch block. This solution has the disadvantage that outputs must be made available at a concentrated point of the switching network which carry a relatively low traffic. Since the internal junctors are connected to the same switch blocks as the callback outputs and the outputs for outgoing and terminating trunk traffic of the trunk links, there may be a higher percentage of lost or incompleted calls for the callback traffic than for the internal traffic, since one less input of the switch block is available for the callback traffic because it has already been seized by the trunk connection. This first solution, therefore, requires switch blocks with large extension sides. If the percentage of incompleted calls in the callback traffic is to match the percentage of incompleted calls in the internal traffic, the expenditure in crosspoints for the callback output becomes very high.

A known circuit arrangement for telephone exchange systems using the crossbar switch technique, connects the callback output of the trunk links and the outputs for outgoing and terminating trunk traffic to different switch blocks. This is the second of the possibilities mentioned above. It avoids the disadvantages of the first solution, but it also has disadvantages. In case of a successful callback in crosspoint arrangements with a non-ideal availability, there is no guarantee that a connection is possible between the switch block, to which the trunk is connected, and the subscriber station sought by the callback.

An object of the invention is to provide a circuit arrangement which avoids the above described disadvantages of the known circuit arrangements.

According to one aspect of the invention, the circuit arrangement solves this problem in that each trunk link is connected to two equally entitled outputs for the outgoing and terminating trunk traffic. For the callback traffic, each trunk link is connected to two different switch blocks in the switching network of the PABX through an additional two outputs. Each of these additional two outputs can be connected with the trunk line or with the callback line via a switching multiple, arranged in the trunk link. This means that each trunk link has at least two equally entitled outputs to the PABX which are independent of the connection of the trunk line to the different switch blocks. Both outputs of the trunk link first serve the terminating or the outgoing trunk traffic. This improves the availability so that the percentage of incompleted calls is reduced and the switching network is simplified.

In this circuit arrangement, the connection is established in such a way that a trunk link is connected in the outgoing and terminating trunk traffic by the control of the PABX. At first, the connection with the switching network of the PABX is arbitrarily made through one of the two outputs. Then, this output is connected with the trunk line or trunk route via the switching multiple arranged in the trunk link. The control is accomplished through a circuit which is located within or intrinsic to the trunk link. This output is used initially for the trunk connection and will be used later to establish the callback. It can be arbitrarily determined by the marking network of the PABX because each output can be connected with the trunk line or with the callback line through the switching multiple.

According to a further aspect of the invention, the callback connection is established in such a way that the control circuit for the PABX causes the switching network to extend the callback traffic from the output of the trunk link that was not seized by the trunk connection. An intrinsic control of the trunk link thereupon connects this output through the switching multiple, arranged in the trunk link, with the callback route. The output not seized by the trunk connection is provided for callback. Hence, that output can be either of the two outputs, all outputs of he switch blocks are equally loaded with traffic. The outputs of the trunk link are connected to different switch blocks. Thus, the size of the switch blocks remains uninfluenced by the callback traffic and the losses or percentage of incompleted calls of the callback traffic are equal to the losses or percentage of incompleted calls of the internal traffic.

According to yet another aspect of the invention, the entering trunk connection is connected to the extension called in a callback. The trunk route is switched over via the switching multiple in the trunk link, thereby using the connection established for the callback, up to said trunk link. The delay in through-connection decreases since the switchover requires no new connection in the switching network of the PABX, but uses the established through-connections.

According to the invention, the circuit arrangement can be operated so that a calling back extension is connected with the callback route of the trunk link. The extension which is to be called back is connected with the trunk route of the trunk link. The ringing means included in the trunk route can also be used to ring up the extension which is being called back. Thus, the calling back as well as the called back extension are connected via the callback route and the trunk route of the trunk link. The called back extension, entering the trunk connection, again is able to establish the connection between the trunk route and the trunk line. The callback route is then released in the trunk link. After releasing the callback route in the trunk link, the connection is released between the trunk link and the extension transferring the trunk call. The callback traffic requires no seizing of an internal route because both extensions of the PABX are directly connected with the trunk link.

In order to establish a conference call at an existing callback connection, the trunk line is connected with the trunk route via an additional contact.

The above mentioned and other features of this invention and the manner of obtaining them will become more apparent, and the invention itself will be best understood by reference to the following description of an embodiment of the invention taken in conjunction with the accompanying drawings, in which.

Figure 1:
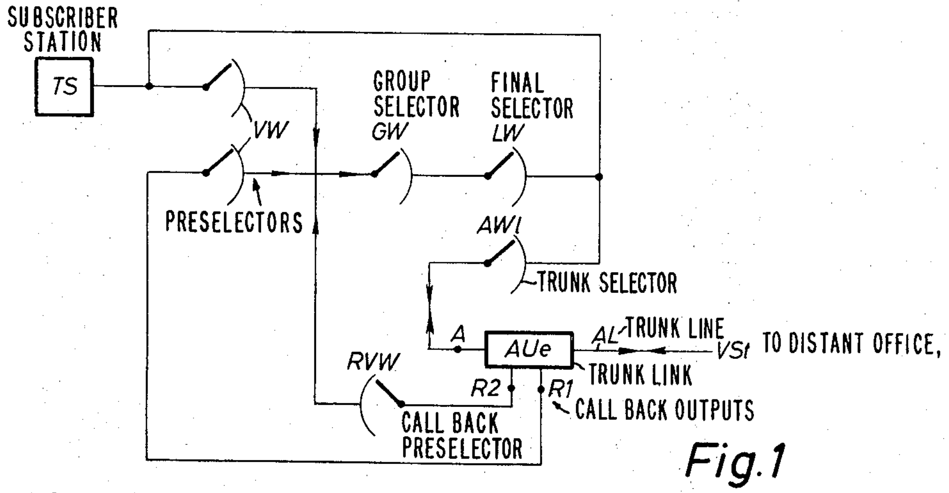
FIG. 1 is a block diagram showing a selector-stage of a PABX.

In the selector-stage of a PABX constructed according to FIG. 1, each trunk link AU*e* has four outputs. The trunk line AL leading to the distant exchange V*st* is connected to one output. The outgoing and terminating trunk traffic is handled via the trunk line output A. The call back outputs R1, R2 serve call back traffic. The internal connections are established through the control from a subscriber station TS which is seized via a preselector VW, a group selector GW, and a final selector LW. The trunk connections are passed in both directions via the trunk selector AW1. The first callback is always handled through the callback output R1. The second callback is handled through the callback output R2. This traffic can be concentrated across a separate callback preselector RVW and then led to the group selector GW. Before a third callback is required, it is probable that the callback output R1 is again available.

Figure 2:
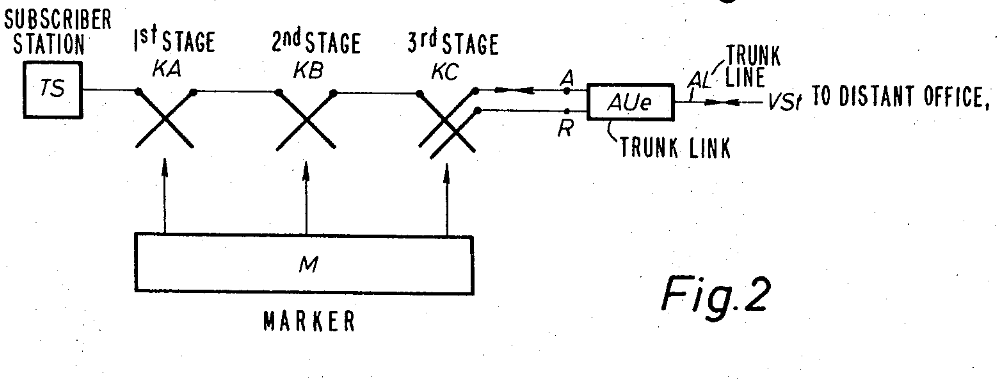
FIG. 2 is a block diagram showing a centrally controlled PABX.

In the centrally controlled PABX taught by FIG. 2, the trunk link AU*e* has only three outputs. The trunk line AL leading to the exchange V*st* is connected to one output. The outgoing and terminating trunk traffic is handled through the output A, and the first callback connection is established through the callback output R. At a second callback, the calling back extension is re-routed to the trunk connection output A. Thus, the second and eventually further callbacks can be performed via the callback output R. The re-routing is carried out through the marker M, having access to all switching stages KA, KB and KC.

Figure 3A:
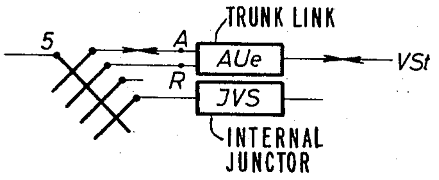
FIG. 3 shows four alternating systems (a) to (d) illustrating how the trunk connection outputs and the callback output of the trunk link are made through the switching network of a centrally controlled PABX.

FIG. 3*a* shows the possibility of making a connection between the trunk link AU*e* and the switching network of the PABX. The trunk connection output A and the callback output R are both connected to the same switch block of the switching network. The internal junctors JVS are also connected to the same switch block. In this circuit arrangement, a higher loss of calls is more likely for the callback traffic than for the internal traffic, because one input of the switch block is always seized by the existing trunk connection to complete a callback. Another problem of this circuit arrangement is that the callback outputs are connected to a concentrated point in the switching network, bearing a very high traffic.

Figure 3B:
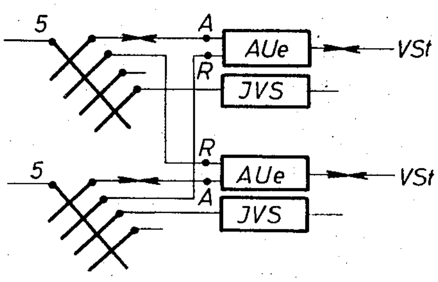

FIG. 3*b* shows a second possibility of making the connection of the trunk links AU*e* to the switching network of the PABX. In contrast to the solution taught by the FIG. 3*a*, the callback output R of a trunk link AU*e* is connected to switch block which is different than the switch block having the trunk connecting output A. Consequently, there is the same probability of loss for the callback traffic and the internal traffic. But this circuit arrangement has a drawback since it is not certain that there is a connection for a successful callback from the trunk connection to the called back extension.

Figure 3C:
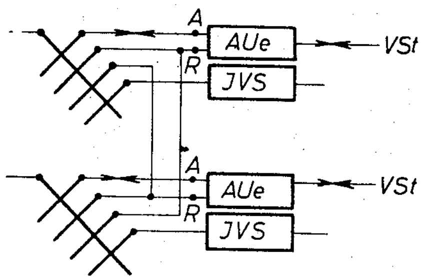

FIG. 3*c* illustrates a third possibility of making the callback connection between the trunk links AU*e* via the switching network of the PABX. This solution avoids the drawbacks of the solution according to FIG. 3*b* where each callback output R is connected to two switch blocks. However, this solution of FIG. 3*c* increases the number of the inefficiently used crosspoints. The switching network outputs, therefore, carry a low level of traffic.

Figure 3D:
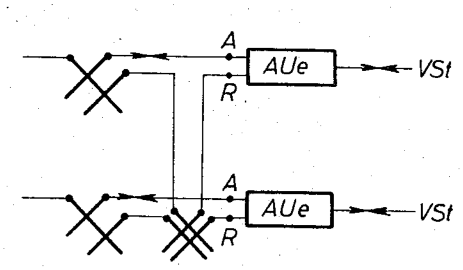

Finally, FIG. 3*d* shows a fourth possibility which is to connect the trunk links AU*e* to the switching network of a PABX. This arrangement requires a smaller number of switching outputs as compared to the number of outputs required by the solution of FIG. 3*c*. But an additional switch block is required, bearing a very low traffic and this interferes with the distinct formation of the switching network. This also requires a considerable additional expenditure for the control of the PABX.

Figure 4:
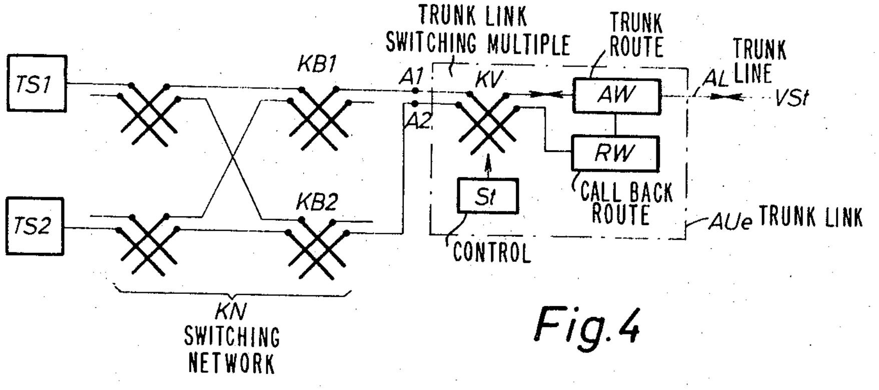
FIG. 4 shows a block diagram of a circuit arrangement constructed according to the invention.

In the inventive circuit arrangement, shown in FIG. 4, the trunk circuit or link AU*e* has two equally entitled outputs A1, A2. Each is connected to the switching network KN of the PABX, connections being made to two different switch blocks KB1, KB2 of the switching network. Internally, in the trunk circuit both outputs A1, A2 are connected through a switching multiple KV with separate control S*t*, to both the trunk route AW and the callback route RW. The trunk line AL is connected to the trunk route AW. In case of outgoing or terminating trunk traffic to or from the distant exchange V*st*, both outputs A1, A2 of the trunk link AU*e* are available for traffic. One output reaches the station TS1 or TS2 via the switching network KN. That output is marked during the route search, and it is seized for the trunk call. The remaining output is available for callback. The output which is used for the trunk call and the one which is available later on for a callback connection can be arbitrary, depending upon selections made by the marking network of the PABX. The switching multiple KV can connect either output with the trunk route AW or with the callback route RW. At first, the decision depends upon whether a connection is possible at all. If it is possible for both outputs, one output can be marked on a per chance decision. The processes in the trunk link AU*e* when establishing a callback connection are explained in conjunction with FIG. 5.

If a callback connection is established via the remaining output and if the called back extension enters into the trunk connection, its connection within the switching network KN is used and connected with the aid of the switching multiple KV in the trunk link AU*e* with the trunk route AW. The output through which the trunk connection was established at first serves in the same way for the next callback. When transferring the trunk connection, no additional marking is required in the switching network KN. The switching multiple KV is re-routed in the trunk line AU*e* with the aid of its intrinsic control S*t*.

As may be gathered from FIG. 4, the output A1 is connected to switch block KB1. The output A2 is connected to the switch block KB2. This connection to different switch blocks is a meaningful measure, but it is not required. This form of connection avoids the disadvantages specified with the aid of FIG. 3*a*, because the size of the switch blocks is independent of the callback traffic. The traffic losses of the outgoing and terminating trunk traffic can be considerably reduced because the availability between the extensions and the trunk links is substantially improved.

Therefore, the expenditure for the circuit arrangement required by the invention can be balanced by a savings in the switching network of the PABX. The outputs of the switching network at a concentrated point handle approximately the same traffic density, and they are economically used. The losses in the callback traffic are the same as the losses in the terminating internal traffic. The output connected with the called back extension can be connected through the switching multiple KV to the callback path or route RW. When re-routing the trunk connection, the output is connected to the trunk route AW.

It shall be assumed for the further description that the callback extension is connected, immediately after dialing with the callback route RW and the extension to be called back is connected with the trunk route AW. This solution has the advantage that the ringing means RG which is connectable to the trunk route can also be used for ringing the extension to be called back.

Figure 5:
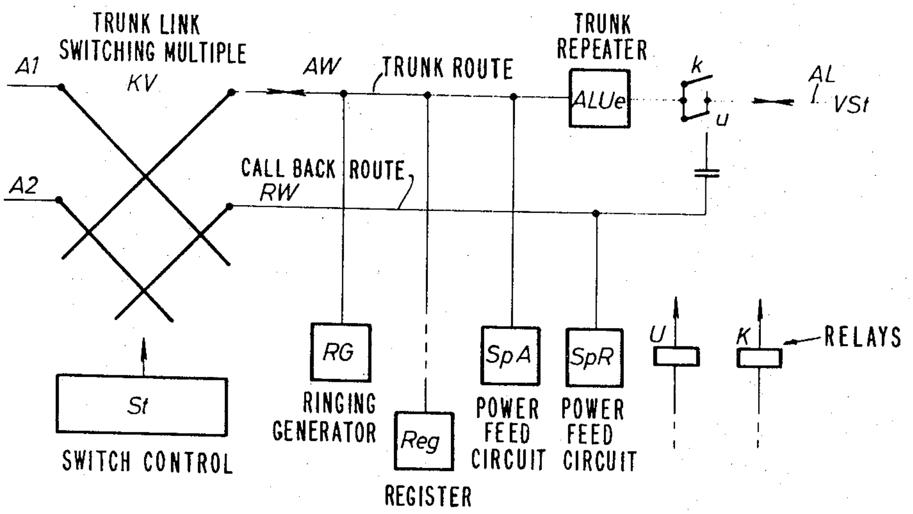
FIG. 5 shows details of the circuitry of the trunk link according to FIG. 4.

With the aid of FIG. 5, the switching processes in the trunk link AU*e* is explained during a callback. It is assumed that a trunk connection is established via the output A1, the switching multiple KV, the trunk route AW, the trunk repeater ALU*e*, contact *u* and trunk line AL to a subscriber who is served by the distant exchange VS*t*. The extension is fed power from the feeding circuit S*p*A of the trunk route. If he actuates his trunk line key, the feeder circuit S*p*A causes relay U to operate to a closed condition in any suitable manner (not shown) and also connect the register R*eg* to the trunk route AW. The calling back extension receives a dial tone from the register. Responsive to the resulting dial pulses, a connection is established between the trunk route AW and the callback route. The subscriber is now disconnected.

The register R*eg* receives the dial pulses identifying the number of the called back extension. After dialing has been completed, the register R*eg* emits a control command to the trunk link which re-routes. The switching multiple KV is operated via the control S*t* in a way such that the extension connected to the output A1 is reconnected via the callback route RW. The called back extension is connected with the trunk route AW via the output A2. The extension to be called is fed power from the feeder circuit S*p*A of the trunk route AW, and it receives ringing tone from the ringing means RG. The extension which called back is fed power from the feeder circuit S*p*R of the callback route RW.

As soon as the called back extension answers, a connection is established via the trunk route AW, the trunk line repeater ALU*e*, the contact *u* and the callback route RW.

As soon as the extension which initiated the callback wants to finish the callback and enter again into the trunk connection, the feeder circuit S*p*R releases the connection to the extension having been called back. After actuating the respective key, the extension having called back is re-routed at the switching multiple KV to the trunk route AW, and the connection to the trunk line AL is re-established via the contact *u*.

On the other hand, if the called back extension wants to enter the trunk connection, which is more frequently the case, only the callback route RW and the connection to the extension having called back is released. The connection to the trunk line AL is restored again via the contact *u*. Further callbacks can be carried out to transfer the call to an arbitrary station in the described way.

For the participants of an established callback connection, it is further provided that they may operate relay K by emitting a particular control signal. For example, they may dial a code digit whereby an additional connection between the trunk route AW and the trunk line AL is established through contact *k* to form a conference call connection.

While the principles of the invention have been described above in connection with specific apparatus and applications, it is to be understood that this description is made only by way of example and not as a limitation on the scope of the invention.

We claim:

1. A circuit arrangement for centrally controlled private automatic branch exchanges with callback traffic, said private automatic branch exchanges having switching networks with a plurality of switch blocks, said circuit arrangement comprising trunk circuit means connected between outputs of said switch blocks and trunk lines, each of said trunk circuit means comprising a first and a second output having equal priorities, said outputs being individually connected to two different switch blocks of said plurality of switch blocks, trunk link switching multiples included in said trunk circuit means, said first and second outputs of said trunk circuit means connected through said trunk link switching multiples to a trunk route and a call back route, respectively, means for selectively connecting said trunk route and said call back route to said trunk lines, and means for controlling said trunk link switching multiples for selectively connecting said first or said second outputs through said switching multiples to the trunk route or the callback route.

2. The circuit arrangement according to claim 8 and means for operating said switching multiples in said trunk circuit means responsive to a separate control in the trunk circuit means.

3. The circuit arrangement according to claim 2 and means whereby the output not seized by the trunk connection is connected during the callback with the called back extension via the switching network, and means for thereupon connecting this output with the callback route via the switching multiple in the trunk means.

4. The circuit arrangement according to claim 3 and means for entering into the trunk connection to cause the called back extension to be re-routed via the switching multiple in the trunk circuit means with the trunk route by using the connection having been established for said callback.

5. The circuit arrangement according to claim 2 and means whereby a calling back extension is connected with the callback route of the trunk circuit means and the extension to be called back is connected with the trunk route of the trunk circuit means, means for using a ringing means in the trunk route for ringing the extension to be called back, and means for mutually connecting the calling back extension as well as the called back extension via the callback route and the trunk route of the trunk circuit means.

6. The circuit arrangement according to claim 5 and means for entering the trunk connection from the called back extension for restoring the connection between the trunk route and the trunk line and releasing the callback route in the trunk circuit means.

References Cited

UNITED STATES PATENTS 3,115,552 12/1963 Fulwiler et al. -------- 179—18

KATHLEEN H. CLAFFY, Primary Examiner

DAVID L. STEWART, Assistant Examiner